June 21, 1949. L. D. MILLIGAN 2,473,658
BROILER
Filed April 19, 1947

INVENTOR
LAWRENCE D. MILLIGAN,
BY Spencer, Marzall,
Johnston & Cook,
ATTORNEYS

Patented June 21, 1949

2,473,658

UNITED STATES PATENT OFFICE 2,473,658

BROILER

Lawrence D. Milligan, Lake Forest, Ill.

Application April 19, 1947, Serial No. 742,685

8 Claims. (Cl. 248—151)

This invention has to do with a supporting stand—more especially a tripod—which is particularly adapted for supporting a broiler or other cooking utensil, although not limited to that specific use.

One of the major objects of my invention is to provide a supporting stand, made preferably of metal, which can quickly and easily be assembled and just as quickly and easily be disassembled or "knocked down" so that the parts can be packed into a small space.

Another object is to provide a supporting stand or tripod which is adapted to support a broiler or other cooking utensil and which will grippingly engage the bottom of the broiler or cooking utensil to secure the same thereon; and more especially to provide a supporting stand or tripod of that character which can quickly and easily be assembled and disassembled.

The improved supporting stand or tripod herein described and claimed is particularly well adapted for use at picnics, garden parties, beach parties etc. where it is desired to set up a broiler at a convenient height above ground, and especially where it is desirable to be able to disassemble the broiler and stand and to pack the same in a minimum of space for convenient transportation or storage.

A preferred embodiment of my invention is depicted in the accompanying drawing, wherein.

Figure 4:
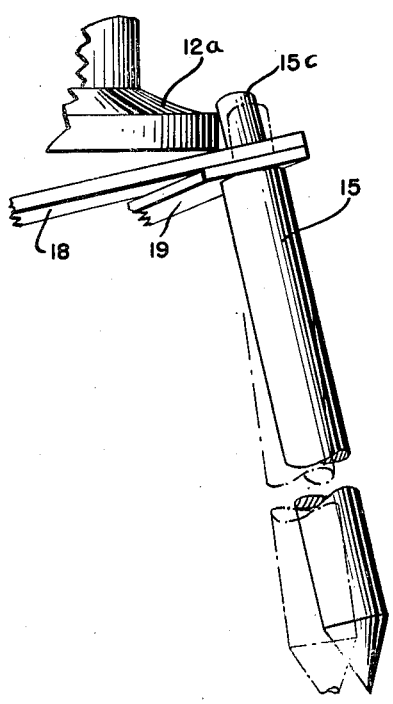
Figure 5:
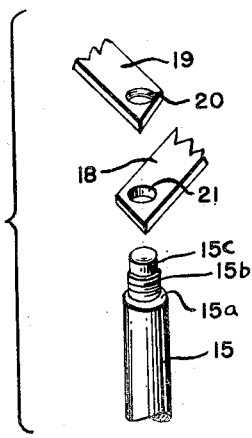

Fig. 4 is an enlarged elevational detail view showing how the supporting stand or tripod can be flexed to enable the same to be grippingly engaged with the base of broiler; and Fig. 5 is an exploded view showing the upper end portion of one of the legs of the supporting stand or tripod together with fragmentary portions of two resilient spring metal tie members which are adapted for connection to the associated leg to form one corner of the stand.

Figure 1:
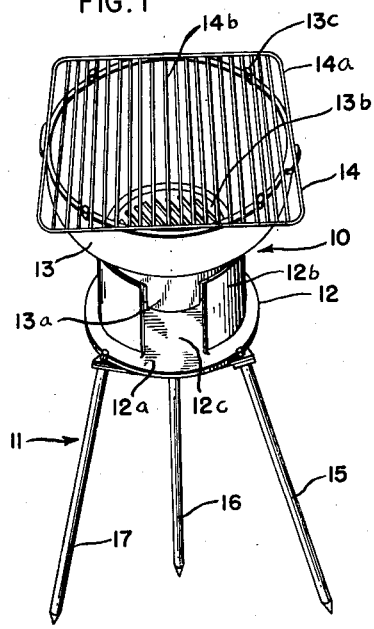
Fig. 1 is a perspective view showing the subject supporting stand or tripod with a broiler mounted thereon.
Figure 2:
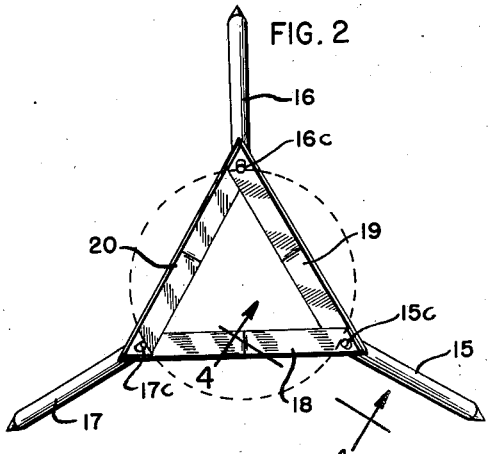
Fig. 2 is a plan view of the supporting stand or tripod—the broiler having been removed.

The complete assemblage shown in Fig. 1 comprises a broiler 10 and a supporting stand 11 on which the broiler is removably mounted.

The broiler is preferably of the type and construction disclosed and claimed in applicant's copending application, Serial No. 646,448, filed February 8, 1946, and consists of three major components, namely: a base 12, a fire pot 13 and a grill 14. The base 12 preferably is cast of metal, such as iron or aluminum, and comprises a disk-like bottom plate 12a and an arcuate vertical wall 12b having a discontinuity forming an opening through which air is admitted to the under side of the fire pot for the purpose of supporting combustion.

The fire pot 13 preferably is an aluminum casting shaped like a bowl and having a depending annular neck 13a which projects downwardly inside wall 12b and serves to center the fire pot on the base casting 12. The space underneath the fire pot and inside wall 12b constitutes an ash pit. Near the bottom of the fire pot and above the ash pit is a grate 13b which may either be integral with the fire pot casting or a separate part.

The grill 14 comprises a rectangular wire rim 14a to which is welded a number of laterally spaced rigid cross wires 14b. Said grill rests on top of the fire pot and is secured against accidental displacement by means of four lugs 13c which are cast integral with the fire pot and project upwardly between adjacent wires of the grill.

The grill 14, fire pot 13 and base 12 are easily separable, and the base can be stowed inside the fire pot, thus minimizing the space required to store the broiler when it is not in use.

The stand 11, which constitutes the subject matter of this invention, is a tripod comprising three legs 15, 16 and 17 disposed symmetrically about the vertical axis of the stand and each tilted at an acute angle to the vertical so that their lower ends are considerably spread to afford greater stability. Each leg consists, preferably, of a round aluminum bar of a length sufficient to elevate the broiler to a convenient height, and each preferably is pointed at its lower end, as shown, and reduced in diameter at its upper end to form a shoulder as indicated at 15a in Fig. 5.

The upper end portion of each leg is interconnected with the upper end portions of the two remaining legs by means of rectangular spring steel strips or tie members 18, 19 and 20, which strips or tie members are each provided at one end with a tapped hole 20 and at the other end with an untapped clearance hole 21—see Fig. 5.

All the legs 15, 16 and 17 are identical and each has a threaded portion 15b of reduced diameter and an unthreaded portion 15c of slightly smaller diameter. The portions 15b are dimensioned each to pass through the untapped clearance hole 21 in one of the strips or tie members and threaded to engage the tapped hole 20 in the other. Thus, as shown in Fig. 5, the upper portions 15b and 15c of leg 15 are dimensioned to pass through the untapped hole 21 in one end of strip 18 while the thread on portion 15b engages the tapped hole 20 in strip 19. As will be apparent, the tapped end of strip 19 functions as a nut to clamp strip 18 against shoulder 15a; and the same arrangement obtains at the upper end of each of the other two legs.

Figure 3:
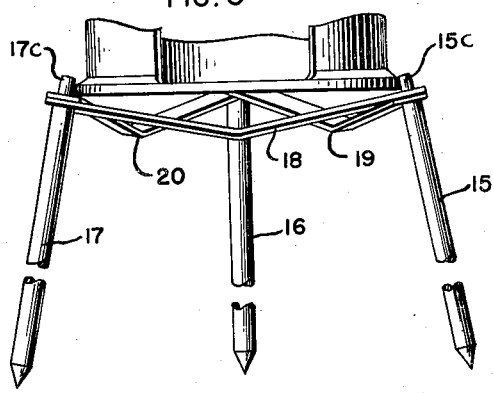
Fig. 3 is an elevational view of the supporting stand or tripod together with a portion of the broiler mounted thereon.

The three strips or tie members 18, 19 and 20 are so bent, see Fig. 3, as to cause the three legs 15, 16 and 17 to assume an appropriate angular stance. This can be accomplished by bending each strip at the center, as illustrated, or at each end, as may be preferred.

The upper ends 15c, 16c and 17c of the three legs project upwardly above the tie members and at the same angle to the vertical as that of the legs; and said upper ends constitute lugs or fingers encircling the base plate 12a and so positioned that their inside upper extremities normally lie on a circle of smaller diameter than that of said base plate 12a, with the result that said fingers or lugs are adapted to overlie the peripheral edge of said base plate as most clearly depicted in Figs. 3 and 4. Thus, said lugs or fingers are effective to grip and secure the base 12 to the stand.

In order to mount the base 12 of the broiler on its supporting stand it is necessary to spread the three fingers 15c, 16c and 17c sufficiently to admit between them the base plate 12a; and this is done, as depicted in Fig. 4, by applying laterally directed pressure to one or more of the legs so as to flex two or more of the spring steel strips 18, 19 and 20. In carrying out this operation the usual practice is to place two of the legs in contact with the ground at their lower ends while holding the remaining leg out of contact with the ground to enable its lower end to be pressed toward the vertical axis of the stand; and the same procedure is ordinarily followed in detaching the base of the broiler from the stand.

It will be seen that my invention provides a novel supporting stand which is inexpensive to produce while at the same time being rigid and durable and capable of being easily and quickly assembled and disassembled and which, in addition, is adapted by virtue of its gripping action to minimize the possibility of the broiler being overturned when in use.

Having described my invention, what I claim as new and wish to secure by Letters Patent is:

1. A supporting stand for a cooking utensil or the like comprising at least three separate unconnected elongate legs arranged symmetrically about a vertical axis and spaced radially from said axis at both their top and bottom ends, said legs each being inclined upwardly toward said axis, said legs being interconnected near their upper ends only through the medium of one or more tie members, the upper end portions of said legs each extending through said tie member or members and forming fingers which are operative conjointly to grip the base of the cooking utensil, said tie member or members being sufficiently flexible in the horizontal plane to enable said fingers to be spread apart to receive the base of the cooking utensil by moving the lower ends of said legs laterally toward the vertical axis of the stand, said tie member or members being operative to spring-press said fingers radially against the base of the cooking utensil.

2. A supporting stand for a cooking utensil or the like comprising three separate unconnected elongate legs disposed symmetrically about a vertical axis and spaced radially from said axis at both their top and bottom ends, said legs each being inclined upwardly toward said axis, three resilient strips interconnecting the upper end portions of said legs, said strips forming, conjointly, an equilateral triangle with one of said legs at each apex, and three fingers integral with the legs and located adjacent the apices of said triangle and projecting upwardly from said strips and converging upwardly toward said vertical axis, said fingers being operative, conjointly, to grip the base of the cooking utensil, said fingers being mutually spreadable at their upper ends by flexing said strips.

3. A supporting stand for a cooking utensil or the like comprising three elongate legs disposed symmetrically about a vertical axis and spaced radially from said axis at both their top and bottom ends, said legs each being inclined upwardly toward said axis, three resilient spring metal strips interconnecting the upper end portions of said legs, said strips forming, conjointly, an equilateral triangle with one of said legs at each apex, respectively, said strips being overlapped at adjoining ends, each of said legs having an upper end portion of reduced diameter, each of said upper end portions projecting through the overlapped end portions of its associated strips and threaded into the upper one of said strips, the diametrically reduced upper end portions of said legs projecting upwardly above said strips to form fingers for gripping the base of the cooking utensil.

4. A supporting stand for a cooking utensil or the like comprising three elongate legs disposed symmetrically about a vertical axis and spaced radially from said axis at both their top and bottom ends, said legs each being inclined upwardly toward said axis, resilient spring metal means of triangular configuration interconnecting the upper end portions of said legs, each leg being located near one of the apices of the triangle, each said leg having a diametrically reduced upper end portion extending through and threaded into said spring metal means and projecting upwardly above said spring metal means to form fingers which are mutually operative to grip the base of the cooking utensil, said fingers being mutually spreadable at their upper ends by flexing said spring metal means.

5. A stand comprising a plurality of spaced legs, tie members operatively connecting the legs together, said tie members being bowed intermediate their ends to render resiliency to said members when connected to said legs to provide a predetermined amount of movement to said legs, each of said legs protruding through the adjacent ends of adjacent tie members.

6. A stand comprising a plurality of spaced legs, tie members operatively connecting the legs together, said tie members each having an opening in one end thereof to slip freely over an end of a leg, the other end of each tie member being provided with a threaded opening for threaded engagement with an adjacent leg.

7. A stand comprising a plurality of spaced legs, tie members operatively connecting the legs together, said tie members each having an opening in one end thereof to slip freely over an end of a leg, the other end of each tie member being provided with a threaded opening for threaded engagement with an adjacent leg, said legs having extensions protruding above the tie members to receive a member therebetween.

8. A stand comprising a plurality of spaced legs, tie members operatively connecting the legs together, said tie members each having an opening in one end thereof to slip freely over an end of a leg, the other end of each tie member being provided with a threaded opening for threaded engagement with an adjacent leg, said legs having extensions protruding above the tie members to receive a member therebetween, said tie members being deformed intermediate their ends to provide resiliency to the tie members to permit limited movement of the legs when connected, whereby said member may be clamped frictionally between said extensions.

LAWRENCE D. MILLIGAN.

REFERENCES CITED

The following references are of record in the file of this patent:

UNITED STATES PATENTS

| Number | Name | Date |
| --- | --- | --- |
| 927,524 | Goode | July 13, 1909 |
| 1,685,988 | Dultmeier | Oct. 2, 1928 |